United States Patent
Regard et al.

(10) Patent No.: US 9,469,466 B2
(45) Date of Patent: *Oct. 18, 2016

(54) METERING VALVE FOR DISPENSING AN AEROSOL

(71) Applicant: Nemera La Verpillière S.A.S., La Verpilliere (FR)

(72) Inventors: Alain Regard, Beynost (FR); Grégoire Gauthier, Bourgoin-Jallieu (FR); Olivier Joly, Grenoble (FR)

(73) Assignee: Nemera La Verpillière S.A.S, La Verpilliere (FR)

(*) Notice: Subject to any disclaimer, the term of this patent is extended or adjusted under 35 U.S.C. 154(b) by 0 days.

This patent is subject to a terminal disclaimer.

(21) Appl. No.: 14/434,862

(22) PCT Filed: Oct. 10, 2013

(86) PCT No.: PCT/IB2013/059258
§ 371 (c)(1),
(2) Date: Apr. 10, 2015

(87) PCT Pub. No.: WO2014/057446
PCT Pub. Date: Apr. 17, 2014

(65) Prior Publication Data
US 2015/0232259 A1 Aug. 20, 2015

(30) Foreign Application Priority Data
Oct. 12, 2012 (FR) .................. 12 59774

(51) Int. Cl.
B65D 83/00 (2006.01)
B65D 83/54 (2006.01)
G01F 11/32 (2006.01)

(52) U.S. Cl.
CPC ............... *B65D 83/54* (2013.01); *G01F 11/32* (2013.01)

(58) Field of Classification Search
CPC ........ B65D 83/52; B65D 83/54; G01F 11/32
USPC .................... 222/402.2, 402.24; 128/200.23
See application file for complete search history.

(56) References Cited

U.S. PATENT DOCUMENTS 2,667,991 A * 2/1954 Boyer ................. B65D 83/382
169/74
2,775,483 A 12/1956 Treharne, Jr. et al.
(Continued)

FOREIGN PATENT DOCUMENTS

CN 1241979 A 1/2000
CN 1747879 A 3/2006
(Continued)

OTHER PUBLICATIONS

International Search Report Application No. PCT/IB2013/059258 Completed: Feb. 3, 2014; Mailing Date: Feb. 12, 2014 2 pages.
(Continued)

*Primary Examiner* — Patrick M Buechner
(74) *Attorney, Agent, or Firm* — St Onge Steward Johston and Reens LLC (57) ABSTRACT

A metering valve for dispensing an aerosol, includes a metering chamber and a valve stem. The valve stem is equipped with one end disposed on the side of a container and a dispensing end mounted in the metering chamber such that it can slide under the force of a spring between a first high position, known as the rest position, and a second position, known as the intermediate position for filing the metering chamber. The metering chamber includes an upper cylindrical compartment and a lower cylindrical compartment, the diameter of the upper compartment being greater than that of the lower compartment.

10 Claims, 4 Drawing Sheets

(56) References Cited

U.S. PATENT DOCUMENTS

| | | | | |
|---|---|---|---|---|
| 2,837,375 | A * | 6/1958 | Efford | B65D 83/14 222/402.13 |
| 2,991,917 | A * | 7/1961 | Ward | B65D 83/54 222/402.2 |
| 3,058,629 | A * | 10/1962 | Gawthrop | B65D 83/425 222/402.16 |
| 3,128,924 | A * | 4/1964 | Gorman | B65D 83/54 222/402.2 |
| 3,773,064 | A * | 11/1973 | Focht | B65D 83/48 137/244 |
| 4,220,265 | A * | 9/1980 | Shay | B65D 83/54 141/20 |
| 4,362,257 | A * | 12/1982 | Shay | B65D 83/54 222/402.2 |
| 4,597,512 | A | 7/1986 | Wilmot | |
| 4,702,400 | A * | 10/1987 | Corbett | G01F 11/32 222/402.2 |
| 5,772,085 | A | 6/1998 | Bryant et al. | |
| 2003/0230603 | A1 | 12/2003 | Smith | |
| 2004/0112923 | A1 | 6/2004 | Tsutsui | |
| 2005/0173466 | A1 | 8/2005 | Goujon et al. | |
| 2006/0237487 | A1 | 10/2006 | Allsop | |
| 2006/0243753 | A1 | 11/2006 | Goujon et al. | |
| 2007/0131722 | A1 | 6/2007 | Goujon et al. | |
| 2008/0087688 | A1 * | 4/2008 | Twyman | B65D 83/54 222/402.2 |
| 2008/0135584 | A1 | 6/2008 | Wickman | |
| 2011/0042419 | A1 | 2/2011 | Hodson et al. | |
| 2015/0298894 | A1 * | 10/2015 | Regard | B65D 83/546 222/402.1 |

FOREIGN PATENT DOCUMENTS

| | | |
|---|---|---|
| CN | 101820938 A | 9/2010 |
| CN | 102235527 A | 11/2011 |
| CN | 104736455 A | 6/2015 |
| EP | 0803449 A1 | 10/1997 |
| FR | 2850166 A1 | 7/2004 |
| WO | 9829321 A1 | 7/1998 |
| WO | 2004022143 A2 | 3/2004 |

OTHER PUBLICATIONS

Written Opinion of the International Searching Authority Application No. PCT/IB2013/059258 Completed: Apr. 14, 2015 pp. 8.

* cited by examiner

METERING VALVE FOR DISPENSING AN AEROSOL

FIELD OF THE INVENTION

The invention relates to the technical field of metering valves for dispensing an aerosol, and more particularly, but not exclusively, retention valves for dispensing pharmaceutical products.

BACKGROUND OF THE INVENTION

The fluid product dispensing valves, notably the metering valves for dispensing pharmaceutical products in the form of aerosol sprays are known. They generally comprise a cylindrical valve body containing a metering chamber extending between two seals, a top seal and a bottom seal, a valve stem sliding in a seal-tight manner in the metering chamber between a rest position, a dispensing position and a final bottom position. The valve body is generally fixed to the neck of a vessel containing the product to be dispensed by means of a capsule crimped onto the neck. By way of example, the application EP 0 803 449 can be cited, which describes a valve known from the prior art.

One problem that this type of valve poses relates to the volume or the quantity of the dose to be dispensed. In effect, such valves are generally used to dispense doses of pharmaceutical products, in which the doses have to be particularly accurate and dispensed constantly. These doses have to be all the more accurate since the metering valve generally contains powder in suspension in a liquid phase comprising a liquefied propellant gas. Also, the valve has to both deliver a volume of a liquid and powder that can be repeated each time it is administered, the liquid being the vector of the powder, but also a very even quantity of powder (dry mass). It is therefore important for the valve to be able to dispense a strictly identical dose of the product throughout its use.

SUMMARY OF THE INVENTION

The aim of the present invention is notably to propose a metering valve that makes it possible to limit the variations of the doses dispensed during the use of the metering device.

To this end, the invention relates to a metering valve for dispensing an aerosol, comprising a metering chamber and a valve stem provided with an end positioned on the side of a tank and a dispensing end and mounted to slide in the metering chamber under the effect of a spring, between a first top position, called rest position, a second position, called intermediate metering chamber filling position, and a third position, called final bottom position, in which the spring is compressed, the valve stem comprising an expulsion orifice linking the metering chamber to the dispensing end when the stem is in the final bottom position, and a filling passage linking a tank to the metering chamber when the valve stem is in the intermediate filling position, a valve in which the metering chamber comprises a top cylindrical compartment and a bottom cylindrical compartment, the diameter of the top compartment being greater than the diameter of the bottom compartment.

Thus, a valve is proposed in which the metering chamber has a geometry such that it exhibits a reduction in section in its inlet area, because it has a smaller diameter. This reduction in section is particularly advantageous in that it allows for a faster filling of the chamber when the valve stem is in the intermediate filling position. In effect, since the bore section is reduced, the fluid circulates faster in this area to fill the metering chamber. In addition to the faster filling, this speed of the fluid is less sensitive to friction at the time of inlet into the chamber, so that the powder in suspension in the liquid to be dispensed runs less risk of becoming attached to the walls during the frictions that take place at the inlet of the chamber. The result thereof is that the dose of product to be dispensed exhibits a more even quantity of powder.

Furthermore, the implementation of a rapid filling of the metering chamber is particularly advantageous in the case of a retention valve. In effect, in a retention valve, the metering chamber is isolated from the tank on the one hand when the stem is in the rest position, on the other hand when the stem is in the final bottom position, so that the metering chamber can be filled only over a relatively limited period, over a portion of the travel of the stem between the rest position and the final bottom position. Also, the metering chamber has to be able to be filled very quickly with the dose to be dispensed, and accurately.

It will be noted that the presence of a top cylindrical compartment of greater diameter makes it possible to limit the axial dimension of the metering chamber, therefore of the valve. In effect, if a relatively small single diameter were used, it would be necessary to provide a longer metering chamber, which is detrimental to the compactness of the device.

In the present description, the expressions “top” and “bottom” refer to the position of the valve stem in relation to the tank to which the metering valve is added. Thus, a bottom position of the stem corresponds to a position in which the stem is closer to the tank than in the case of a top position of the stem.

“The spring is compressed” should be understood to mean that the spring is in a configuration of maximum compression in the valve, but this does not necessarily mean that the turns of the spring are abutting.

The metering valve is generally intended to be fitted onto the neck of a tank containing a fluid product to be dispensed in the form of an aerosol, more particularly a pharmaceutical product. It is intended to be used in the inverted position, also called “head down”.

The metering valve can further comprise one or more of the following features, taken alone or in combination. A shoulder is formed at the interface between the two compartments, the final bottom position of the valve stem being defined by an abutment of a shoulder formed on the valve stem with the shoulder formed inside the metering chamber at the interface between the two compartments. The result thereof is that the valve stem is more centered relative to the metering chamber, that is to say that it does not risk being offset. In effect, since the abutment is located in the metering chamber, the axial orientation of the valve stem is more guaranteed than in the valves of the prior art, where the final bottom position is generally defined by an abutting of the valve stem against the spring which is in a totally compressed state, with its turns abutting. The fact that the final bottom position is defined by the spring at the end of its travel, that is to say when the spring arrives in its full compression state, presents a risk of slightly offsetting the end of the valve stem, because of a possible slight offsetting or overlapping of the turns of the spring when they are abutting. Now, the slightest offsetting of the end of the stem risks creating a slight loss of seal-tightness between the stem and a top seal and/or a bottom seal of the metering chamber. This loss of seal-tightness can cause the dose of liquid and/or powder dispensed to vary. Furthermore, in the case where the metering valve is equipped with a dose metering system, the position of the valve stem has to be particularly accurate because it is the position of the stem relative to the valve body or to a ferrule which enables the meter to consider that a dose has been delivered or not. Thus, the efficiency of the dose meter depends on the accuracy of the position of the valve stem. Now, when the valve stem is stopped by the spring at the end of its travel, it is stopped at a distance which can vary from one dose to another, and even more from one metering valve to another, on the one hand because the compressed configuration of a spring can depend on the force exerted by the user or even on the plastic deformation of the spring over time, and on the other hand because the spring can have a tendency, during its compression, to be positioned askew in its housing, such that this can slightly offset the height of the valve stem in the final bottom position.

The shoulder formed on the valve stem is arranged in such a way that the abutment surface extends in a plane at right angles to the axis of the valve stem. It preferably comprises a protuberance formed on the valve stem, the protuberance being able to be annular or semi-annular, for example an annular flute. The shoulder formed inside the metering chamber can also furthermore comprise an annular or semi-annular protuberance.

The shoulder formed on the valve stem is arranged in such a way that the abutment surface extends in a plane not at right angles to the axis of the valve stem. For example, it comprises an annular or semi-annular protuberance cooperating by a tapered or spherical bearing with the metering chamber, or else a tapered or spherical surface cooperating with an annular or semi-annular protuberance formed in the metering chamber.

The shoulder formed on the valve stem is borne by a protuberance also providing a function of abutment of the valve stem with a top wall of the metering chamber when the valve stem is in the rest position. Thus, a same protuberance is used to ensure both the abutment function defining the final bottom position and that defining the rest position. This shows how more accurate doses can be obtained, since the valve has only the production tolerances of this protuberance, whereas, in the case where the abutments were provided by two distinct parts separate from one another, the valve would have the production tolerances of each of these parts.

The bottom cylindrical compartment and/or the top cylindrical compartment has a height in the axial dimension of the device lying between ¼ and ¾ of the total height of the metering chamber. Thus, the bottom cylindrical compartment extends over a sufficient height to have a notable effect on the speed of filling of the metering chamber.

In the final bottom position of the stem, the spring is not completely compressed.

The end of the valve stem comprises a first bearing surface against an inlet seal of the metering chamber ensuring a first sealing of the metering chamber with respect to a tank when the stem is in the rest position. Preferably, this end of the valve stem comprises a part added on, forming a cap, the first bearing surface against the inlet seal being formed on this cap.

The first sealing between the end of the stem and the seal is produced in the axial direction of the device.

The valve stem comprises a second bearing surface against an inlet seal of the metering chamber ensuring a second sealing of the metering chamber with respect to a tank when the stem is in the final bottom position.

The second sealing between the stem and the seal is produced in the radial direction of the device.

The valve comprises a continuous annular aperture, for the inlet of the aerosol into the metering chamber, the aperture being defined by the space between an inlet seal and the valve stem when the stem is in the intermediate position. In other words, the stem does not have a rib at least over a part of its height, such that, when the stem is in the intermediate position, there is a continuous annular channel, which therefore has a clear section and which thus makes it possible to have the liquid pass more rapidly into the metering chamber than in the case where the stem has ribs.

Another subject of the invention is a metering valve for dispensing an aerosol comprising a metering chamber and a valve stem provided with an end positioned on the side of a tank and a dispensing end and mounted to slide in the metering chamber under the effect of a spring, between a first top position, called rest position, a second position, called intermediate metering chamber filling position, and a third position, called final bottom position, in which the spring is compressed, the valve stem comprising an expulsion orifice linking the metering chamber to the dispensing end when the stem is in the final bottom position, and a filling passage linking a tank to the metering chamber when the valve stem is in the intermediate filling position, the valve comprising a continuous annular aperture for the aerosol to enter into the metering chamber, the aperture being defined by the space between an inlet seal and the valve stem when the stem is in the intermediate position.

It will be understood that this valve can comprise one or more of the characteristics presented in this description taken alone or in combination.

BRIEF DESCRIPTION OF THE DRAWINGS

The invention will be better understood on reading the following description, given solely as an example and with reference to the drawings in which:

FIG. 1 is a view in longitudinal cross section of a metering valve according to one embodiment, in the top rest position, the metering chamber being isolated from the outside of the dispensing device and from the inside of the tank.

FIG. 2 is a view similar to FIG. 1, in which the valve is in the intermediate position, in which the metering chamber communicates with the inside of the tank and is isolated from the outside of the device.

FIG. 3 is a view similar to FIG. 1, in which the valve is in the final bottom position, in which the metering chamber communicates with the outside of the device and is isolated from the inside of the tank.

FIGS. 4A and B are two different views in longitudinal cross section of the stem of the valve of FIG. 1.

DETAILED DESCRIPTION OF THE INVENTION

With reference in particular to FIG. 1, a valve 1 is represented of the metering valve type for dispensing a fluid product, notably medicinal, in aerosol form, by means of propellant gas, notably of HFA type. Of course, the present invention can also be applied to valves of another type or used in different fields, such as perfumery or cosmetics, and with other propellant gases, for example CFC or compressed air.

The valve is suitable for operating, or designed to operate, in the inverted position, that is to say in the position as represented in the drawings. In other words, the valve of the invention is intended to be used in a position in which the valve is situated under the tank containing the product to be dispensed, taking the direction of gravity as reference.

Figure 1:
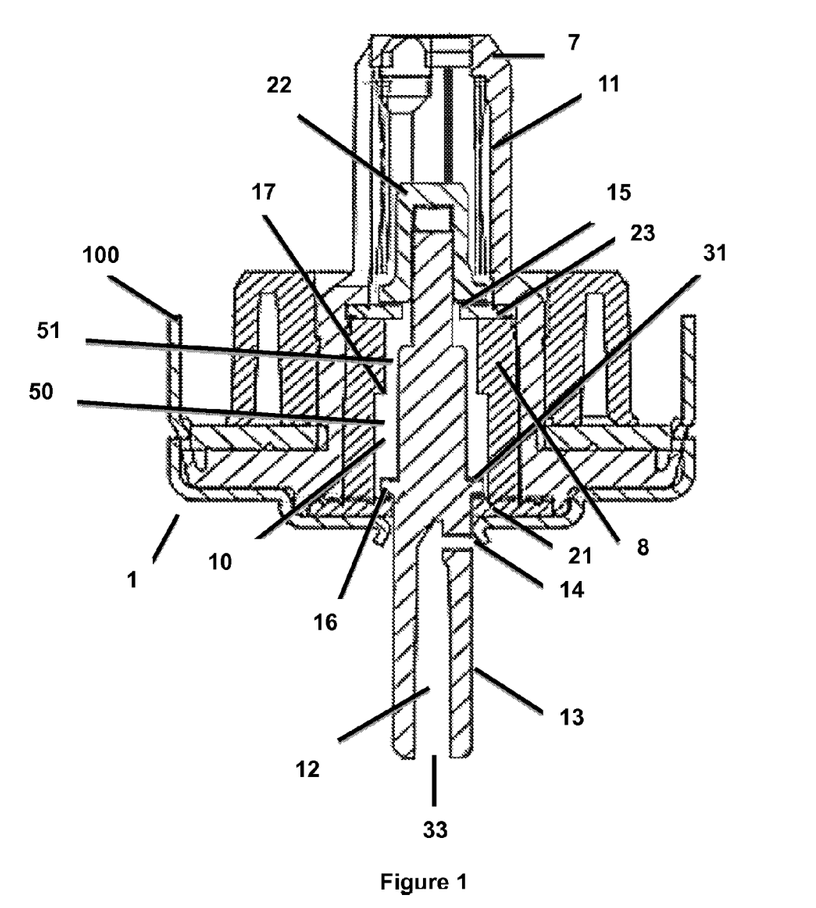

The valve 1 represented in FIG. 1 comprises a valve body 7 in which is added notably a ring 8, delimiting a metering chamber 10, or dose chamber. A valve stem 13 is fitted to slide in the metering chamber 10, between a first top position, called rest position, represented in FIG. 1, and a third dispensing position, or final bottom position, represented in FIG. 3, in which the valve stem is depressed axially toward the interior, or toward the bottom, of the valve 1, by being placed in abutment. The valve stem 13 is stressed toward its rest position by a spring 11, or return means, which is compressed when a user actuates the valve and pushes the valve stem axially inside the valve. When the user relaxes his or her actuation force, the compressed spring 11 returns the valve stem 13 from its dispensing position to its rest position.

During the actuation of the valve stem 13, from the top position to the bottom position, or when the valve stem 13 is returned from its final bottom position to its top rest position, the valve stem 13 assumes a second position, called intermediate position, allowing the metering chamber 10 to communicate with the tank on which the valve is fitted. It will be noted that the first, second and third positions of the stem correspond to distinct positions.

The valve stem comprises, in its top part, a central axial channel 12 emerging on one side on an axial outlet orifice 33, intended to be connected to a dispensing end fitting, for example a spraying end fitting, and on the other side on a radial channel 14, which emerges in the metering chamber 10 when the valve stem 13 is in the dispensing position. The metering chamber 10 communicates with a tank and with the outlet orifice 33 respectively by virtue of a filling passage 15 and the channel 14, also called expulsion orifice. To this end, the valve 1 comprises a top seal 21, or outlet seal, forming a sealing between the metering chamber and the outside, and a bottom seal 23, or inlet seal, forming a sealing between the tank and the metering chamber. It will be understood that when the passage 15, respectively 14, is closed, the valve stem 13 slides in a seal-tight manner against the bottom seal 23, respectively against the top seal 21, such that liquid cannot infiltrate between the stem 13 and the seal 23, respectively between the stem 13 and the seal 21.

Figure 2:
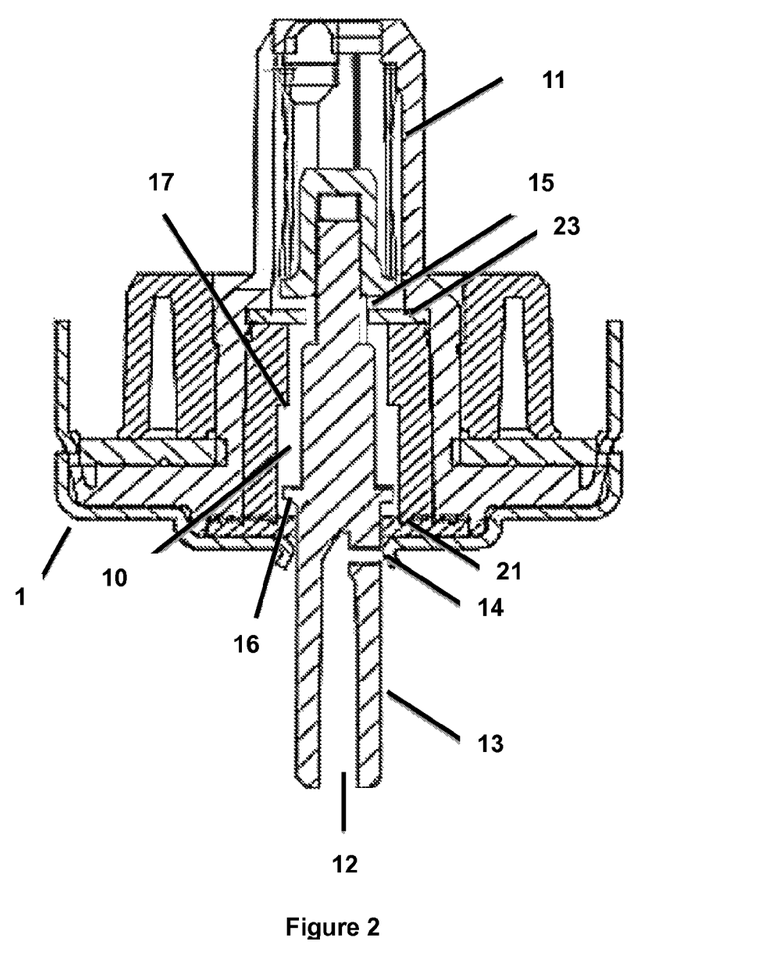
Figure 3:
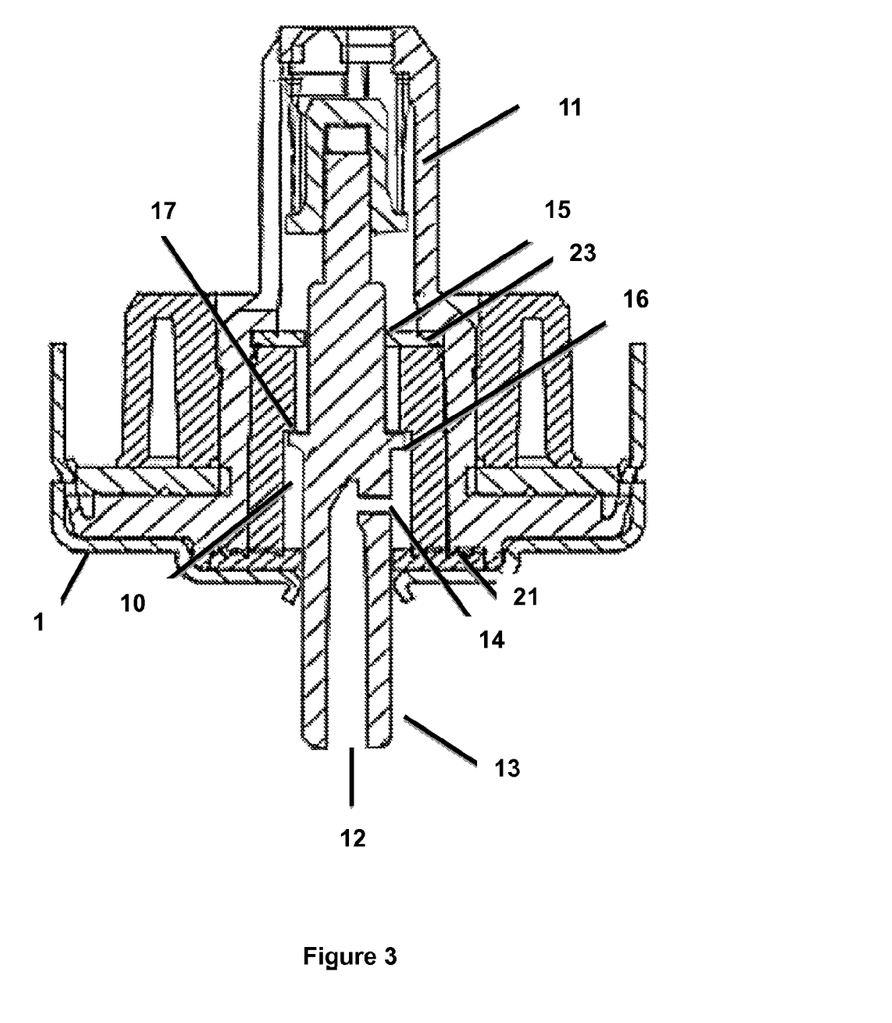

The valve, and more specifically the valve body 7, is joined to the tank by means of a fitting member 100, which is advantageously a ferrule or capsule to be crimped as represented in FIGS. 1 to 3. It should be noted here that the fitting member 100 could be of a different type, for example a screwing, snap-fitting or similar means.

The metering chamber 10 consists, in this example, of a top cylindrical compartment 50 and a bottom cylindrical compartment 51, the diameter of the top compartment being greater than the diameter of the bottom compartment. A shoulder 17 is formed at the interface between the two compartments. In other words, the metering chamber 10 of the valve is constructed as follows:
  the top part 50 of the metering chamber 10 is essentially cylindrical of circular section, of a first determined diameter, and
  the bottom part 51 of the metering chamber is essentially cylindrical of circular section, of a second determined diameter; the second diameter of the bottom part of the metering chamber being smaller than that of the top part of the metering chamber,
  the two cylinders being coaxial and juxtaposed in the axial direction, one being in the extension of the other,
  the sum of the volumes of the two cylinders, from which the volume of the valve stem 13 in this area is subtracted, defining the volume of the dose dispensed by the valve 1, upon its actuation.

The bottom cylindrical compartment 51 and the top cylindrical compartment 50 each have a height in the axial dimension of the device lying between ¼ and ¾ of the total height of the metering chamber. In the example illustrated in the figures, the bottom cylindrical compartment 51 has a height in the axial dimension of the device lying between ¼ and ½ of the total height of the metering chamber, more specifically a height close to ⅓ of the total height of the metering chamber.

The bottom wall of the metering chamber 10 is delimited notably by the bottom seal 21, and the top wall 10 of the metering chamber is delimited notably by the seal 23.

The interface between the bottom part and the top part of the metering chamber 10 forms the shoulder 17.

Here the position assumed by the valve stem 13 when the latter is actuated and the valve stem comes into abutment with the shoulder 17 formed in the metering chamber is defined by the final bottom position. This final bottom position is also called aerosol dispensing position, since the dispensing orifice 14 is then in communication with the metering chamber 10 and allows the release of the aerosol through the dispensing end 12. It will be noted that the orifice 14 is in communication with the outside before the final bottom position is reached, and that the final bottom position corresponds to one dispensing position out of several successive dispensing positions. This position is represented in FIG. 3. It will be noted, in the final bottom position, that the two parts 50 and 51 of the chamber communicate with one another. In other words, there is never any sealing between these two parts 50, 51.

The top rest position corresponds to the position in which the spring is most relaxed and exerts a minimum thrust on the valve stem. The metering chamber 10, in the rest position, is isolated both from the outside of the device and from the inside of the tank to which the valve is fixed. This position is represented in FIG. 1. By virtue of this double isolation of the metering chamber in the rest position, the valve 1 is a so-called "retention" valve, because the chamber is normally filled and the liquid that it contains communicates neither with the tank nor with the outside. It will be noted that the valve delivers the dose a little before reaching the final rest position.

An intermediate position is also defined, which corresponds to a position assumed by the valve stem 13, between its top and bottom positions described above. In this intermediate position, the metering chamber 10 communicates only with the inside of the tank onto which the valve 1 is fitted. This position is represented in FIG. 2.

FIG. 1 shows the valve 1 in the top position, or rest position.

In this position, the metering chamber 10 is isolated in a seal-tight manner from the outside of the device and from the inside of the tank on which the valve is fitted.

The sealing of the metering chamber 10 is ensured:
  in the top part of the metering chamber 10, by radial cooperation between the seal 21 and the valve stem 13, as well as by axial cooperation between the protuberance 14 and the seal 21, and in the bottom part of the metering chamber 10, by axial cooperation between the seal 23 and a part of the valve stem 13. More specifically, the valve stem comprises a part 22, added onto its bottom end 40, here forming a cap.

Figure 4:
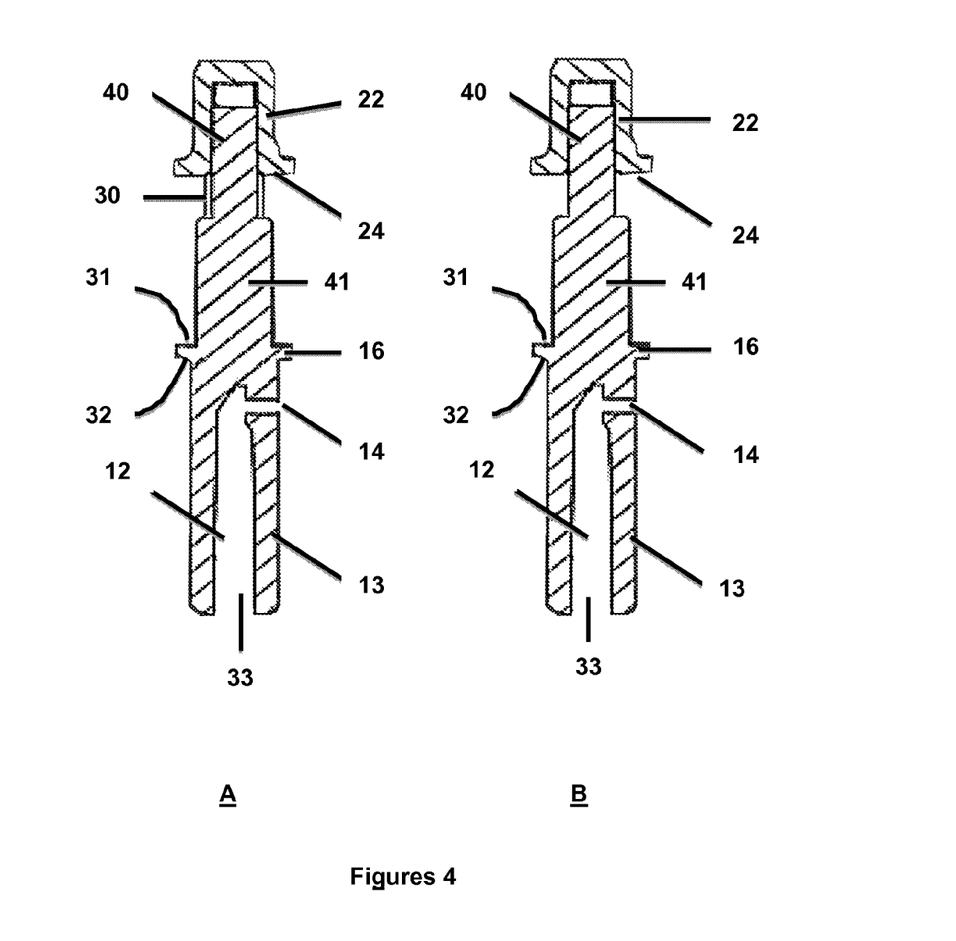

In the rest position, the bottom end 40 of the valve stem 13 oriented toward the bottom of the valve, more specifically the cap 22, cooperates with the spring 11. The cap 22 has an essentially planar and horizontal surface 24, opposite the surface cooperating with the spring 11 and represented in the FIGS. 4. This planar surface 24, which serves as bearing surface against the bottom seal 23, abuts with the bottom seal 23 in the rest position of the valve stem 13. The cooperation between the cap 22 and the seal 23 ensures the sealing of the bottom part of the metering chamber 10 in this position. Also, in the rest position, the seal 23 and the planar surface cooperate axially, by crushing seal 23, in order to ensure the sealing of the metering chamber 10. If the device to which the valve is fixed is in the "head up" position (the valve being in the reverse position to that represented in the figures), the aerosol contained in the metering chamber cannot escape to the tank. Moreover, the axial sealing has the effect of limiting the wear of the seal 23 during the sliding of the stem 10, as would be the case in the case of a radial mobilization of the seal 23. It will be noted that this radial mobilization of the seal 23 can take place slightly when the valve stem comprises ribs interfering slightly with the seal 23. Thus, it is particularly advantageous to provide a stem 13 without ribs cooperating with the seal 23.

Still in the rest position, the top part of the valve chamber 10 is hermetically sealed by two means:

a first means consisting of the radial cooperation between the valve stem 13 and the top seal 21 to ensure the sealing of the metering chamber 10, and an auxiliary means consisting of an axial cooperation between a protuberance 16 of the valve stem 13 and the top seal 21.

Thus, by virtue of the auxiliary means, the sealing of the top part of the metering chamber is increased by the crushing of the seal 21 by the annular protuberance 16 of the valve stem. The aerosol contained in the metering chamber 10, when the valve is in the overturned position as indicated in the figures, cannot therefore escape to the outside.

Advantageously, the protuberance 16 of the valve stem 13 forms a shoulder 31 defining an essentially planar and horizontal surface which abuts with the shoulder 17 of the metering chamber 10. The protuberance 16 of the valve stem 13 also forms a second shoulder 32 opposite the shoulder 31, the second shoulder 32 also forming an essentially planar surface which abuts with the top seal 21, when the valve stem is in the top position, or rest position.

The abutment of the second surface of the protuberance of the valve stem 13 with the top seal 21 serves to hermetically block the outlet end 12 of the metering chamber 10 when the valve stem is in a top rest position.

The protuberance 16 of the valve stem 13, through its two shoulders borne by a single protuberance, makes it possible to reduce the manufacturing tolerances of the stem. Moreover, the presence of a single protuberance 16 having two shoulders makes it possible to reduce the volume occupied by the valve stem 13 in the metering chamber 10, and improve the accuracy of a dose metering system when it is coupled to the metering valve.

When the valve stem 13 is stressed into its dispensing position, as indicated in FIG. 3, by compression of the spring 11, the shoulder 16 formed on the valve stem abuts with the shoulder 17 of the metering chamber. This shoulder 16 of the valve stem 13 is advantageously an annular protuberance, having the effect of increasing the solidity of the shoulder 16 in the case of an excessively strong abutment against the shoulder 17 of the metering chamber. It is, however, possible to provide other forms of shoulders, notably in the form of partially annular protuberance(s). It will be understood that the spring 11 acts as a member for returning the valve stem 13 to its rest position. It is understood that any elastic member applying the same effect to the valve stem is also suitable and can be called spring.

The valve stem 13 cannot be stressed axially beyond the shoulder 17 of the metering chamber, so this is its final bottom position or dispensing position.

The abutment of the valve stem 13 has the effect of reducing the stress of the spring 11, because it is not necessarily fully compressed, and of ensuring its longevity.

It is found in fact that, in the field of metering valves, the springs stressed to their maximum, called springs operating at end of travel, have a tendency to be skewed, that is to say to be displaced in such a way that they are no longer positioned axially relative to the valve stem (the outer jacket of the spring is no longer strictly a cylinder). In such a position, the spring can exert a radial force in addition to the axial force, this radial component being able to displace the valve stem. Such a change of position of the spring 11, not only is likely to modify the end-of-travel position of the stem 13, but can also provoke sealing losses between the valve stem 13 and the seals 21 or 23.

It is understood that, in the rest position in the present retention valve, the bearing surface 24 of the cap and the surface 32 of the protuberance 16 simultaneously bear on seals 21, 23, which guarantees the isolation of the metering chamber with respect to the tank and to the outside. It is also understood that the seals 21, 23 are made of elastomer material, without which the sealing would be theoretically impossible because there would then be non-deformable materials.

Referring in particular to FIG. 2, the valve stem 13 can slide in the metering chamber 10, between the top 23 and bottom 21 seals, in a so-called intermediate filling position.

When the valve stem 13 is mobilized toward the bottom of the valve, exerting a thrust on the spring 11, the valve in its intermediate position as defined previously makes it possible for the aerosol to enter from the tank to the metering chamber 10, through the bottom part of the metering chamber.

The aperture in the bottom part of the metering chamber 10 corresponds to an annular aperture 15 defined between the bottom seal 23 and the bottom part 40 of the valve stem 13. In the example, this aperture 15 is continuous but optionally could be semi-annular, in the form of ring segments delimited by ribs which could optionally be formed on the stem 13. On the bottom part 40 of the valve stem 13, the valve stem does not cooperate radially, at least partly, with the bottom seal 23, thus creating a free space through which the aerosol contained in the tank on which the valve is fitted can penetrate into the metering chamber 10.

According to a specific embodiment, the bottom part 40 of the valve stem 13 which does not cooperate at least partially with the top seal 23 could be of semi-annular form interrupted by one or more, notably two to six, preferentially three to six, axial ribs 30. The presence of ribs 30 offers the advantage of reinforcing the valve stem in this area, but, however, the drawback of reducing the section of the passage 15. Such a valve stem 13 is represented in FIG. 4A.

According to a specific embodiment the valve stem 13 does not comprise any axial ribs 30, and therefore has an annular bottom part 40 as represented in FIG. 4B. Thus, because there are no ribs, the passage 15 is a continuous annular aperture for the aerosol to enter into the metering chamber. The result thereof is that the bore section is greater, which is particularly advantageous in the case of a retention valve.

The valve stem 13 can finally assume a fourth position in which the metering chamber 10 is isolated from the outside and from the inside of the tank. In this fourth position, the valve stem has slid axially between the bottom 23 and top 21 seals, but the shoulder 31 has not yet abutted with the shoulder 17 of the metering chamber 10.

The top part of the metering chamber is still sealed by the part of the valve stem 13 included above the protuberance 16, but without the orifice 14, or a radial channel 14, being in contact with the inside of the metering chamber 10.

The bottom part of the metering chamber 10 is blocked by the cooperation of the part 41 of the valve stem 13 immediately above the bottom part 40 of the valve stem 13.

Since the diameter of the part 41 of the valve stem 13 is greater than the internal diameter of the seal 23, the part 41 cooperates radially with the seal 23, thus blocking the bottom part of the metering chamber 10.

Such blocking of the bottom part of the metering chamber 10 has the effect of preventing the communication between the tank and the outside of the device when the valve stem 13 is in the final bottom position. Thus, only the content of the metering chamber 10 can be dispensed.

It will be noted that the invention is not limited to the embodiments described above.

The invention claimed is:

1. A metering valve for dispensing an aerosol, comprising
   a metering chamber, and
   a valve stem provided with an end positioned on the side of a tank and a dispensing end and mounted to slide in the metering chamber under the effect of a spring, between a first top position, being a rest position, a second position, being an intermediate metering chamber filling position, and a third position, being a final bottom position, in which the spring is compressed, wherein, in the rest position, the metering chamber is isolated both from an outside of the valve and from an inside of the tank onto which the valve is fixed,
   the valve stem comprising an expulsion orifice linking the metering chamber to the dispensing end when the stem is in the final bottom position, and a filling passage linking the tank to the metering chamber when the valve stem is in the intermediate filling position,
   wherein the metering chamber comprises a top cylindrical compartment and a bottom cylindrical compartment, the diameter of the top compartment being greater than the diameter of the bottom compartment.

2. The metering valve for dispensing an aerosol according to claim 1, in which the bottom cylindrical compartment and/or the top cylindrical compartment has a height in the axial dimension of the device lying between ¼ and ¾ of the total height of the metering chamber.

3. The metering valve for dispensing an aerosol according to claim 1, in which the valve comprises a continuous annular aperture for the inlet of the aerosol into the metering chamber, the aperture being defined by the space between an inlet seal and the valve stem when the stem is in the intermediate filing position.

4. The metering valve for dispensing an aerosol according to claim 1, in which, in the final bottom position of the stem, the spring is not completely compressed.

5. The metering valve for dispensing an aerosol according to claim 1, in which a shoulder is formed at the interface between the two compartments, the final bottom position of the valve stem being defined by an abutment of a shoulder formed on the valve stem with the shoulder formed inside the metering chamber at the interface between the two compartments.

6. The metering valve for dispensing an aerosol according to claim 5, in which the shoulder formed on the valve stem is borne by a protuberance also providing a function of abutment of the valve stem with a top wall of the metering chamber when the valve stem is in the rest position.

7. The metering valve for dispensing an aerosol according to claim 1, in which the end of the valve stem comprises a first bearing surface against an inlet seal of the metering chamber ensuring a first sealing of the metering chamber with respect to the tank when the stem is in the rest position.

8. The metering valve for dispensing an aerosol according to claim 7, in which the first sealing between the end of the stem and the seal is produced in the axial direction of the device.

9. The metering valve for dispensing an aerosol according to claim 1, in which the valve stem comprises a second bearing surface against an inlet seal of the metering chamber providing a second sealing of the metering chamber with respect to the tank when the stem is in the final bottom position.

10. The metering valve for dispensing an aerosol according to claim 9, in which the second sealing between the stem and the seal is produced in the radial direction of the device.

* * * * *